United States Patent [19]

Yamada et al.

[11] Patent Number: 4,542,865

[45] Date of Patent: Sep. 24, 1985

[54] AUTOMATIC FILM REWINDING DEVICE

[75] Inventors: Tateo Yamada; Hiroyuki Kimura, both of Kanagawa; Hideo Taka, Tokyo, all of Japan

[73] Assignee: Canon Kabushiki Kaisha, Tokyo, Japan

[21] Appl. No.: 554,259

[22] Filed: Nov. 22, 1983

[30] Foreign Application Priority Data

Nov. 25, 1985 [JP] Japan .............................. 57-206301
Feb. 28, 1983 [JP] Japan .............................. 58-30869

[51] Int. Cl.$^4$ ......................... G03B 1/04; G11B 15/32
[52] U.S. Cl. .................................... 242/205; 242/191; 352/173
[58] Field of Search ...................... 242/67.4, 186, 190, 242/191, 201, 205, 208, 209; 352/169, 170, 173–177, 72; 360/74.1; 226/49; 354/212–215, 288

[56] References Cited

U.S. PATENT DOCUMENTS

| | | | |
|---|---|---|---|
| 2,912,899 | 11/1959 | Wangerin et al. | 352/72 |
| 3,995,291 | 11/1976 | Momose | 354/173 |
| 4,079,398 | 3/1978 | Ichiyanagi | 354/212 |
| 4,134,657 | 1/1979 | Nomura | 354/212 |
| 4,400,074 | 8/1983 | Akiyama et al. | 354/173 |

Primary Examiner—Leonard D. Christian
Attorney, Agent, or Firm—Toren, McGeady, Stanger, Goldberg & Kiel

[57] ABSTRACT

In an apparatus such as a camera which automatically performs film winding and rewinding by means of a motor, an automatic rewinding circuit is arranged to detect interruption of a winding action by means of a timer circuit which is set at a length of time longer than a predetermined length of winding time. Upon detection of the interruption, the automatic rewinding circuit automatically shifts the winding action to a rewinding action. The apparatus is also provided with a memory storage which mechanically memorizes the operating state of the automatic rewinding circuit or with a forced rewinding device which permits a rewinding operation irrespective of the operating state of the automatic rewinding circuit.

15 Claims, 5 Drawing Figures

AUTOMATIC FILM REWINDING DEVICE

BACKGROUND OF THE INVENTION

1. Field of the Invention:

This invention relates to an apparatus such as a camera which is arranged to automatically perform film winding and rewinding by means of a motor.

2. Description of the Prior Art:

A camera which is arranged to wind and rewind a roll of film with a motor and to automatically rewind the film when the film comes to the end of the roll with a predetermined number of frame portions thereof wound up has been proposed in U.S. Pat. No. 4,400,074. In this camera, the travelling state of the film is detected and, in case that the film travel is interrupted, a rewinding action is carried out with the film considered to have come to the end of the roll. The device for carrying out this operation includes a timer circuit which is set at a very short time for a period of time required for winding each frame portion of film. The timer circuit is arranged to be reset by the rotating action of a rotating body which is responsive to the film travel and not to reach the end of the set time while the film is in transit. When the timer circuit reaches the end of a set length of time, the film rewinding action is permitted to occur with the film considered to have come to its end state thus stopping the rotating body from rotating.

Such an apparatus, however, necessitated provision of an additional member such as the above-stated rotating body for detecting the travelling state of the film. This complicates the structural arrangement and is extremely disadvantageous for an apparatus that must meet a requirement for reduction in size. Further, in the case of an apparatus of this type, the film comes to an end position the instant the timer circuit is reset by the rotating body and, when the travel of the film comes to a stop, the timer circuit remains in a reset state to automatically hinder a rewinding action. Therefore, to solve this problem, it is necessary to use a detection circuit such as a differentiation circuit for detecting that instant. Then, the detection circuit further complicates the structural arrangement.

Further, when a film rewinding action begins in the apparatus of the kind arranged to automatically rewind a roll of film, if the battery which is used as a power source is consumed to such a degree that it is no longer capable of rewinding the whole roll of film, the film would come to a stop before completion of the film rewinding action. In that instance, in the case of an arrangement to electrically control the film rewinding action, the electric circuit provided for that purpose would be reset upon replacement of the consumed battery. As a result of that, the camera or apparatus would be brought into a wound up state to permit no further film rewinding when the battery is replaced with new one. Moreover, contemporary cameras are generally arrranged to automatically come to a stop upon completion of film rewinding. The operator who is accustomed to cameras of this type tends to think that the film has been completely rewound and thus tends to ruin the roll of film by opening the lid of the camera when the film rewinding action comes to a stop halfway under the above-stated condition.

SUMMARY OF THE INVENTION

It is a first object of the invention to provide an automatic film rewinding device of extremely simple structural arrangement for an apparatus arranged to automatically perform film winding and rewinding with a motor, wherein the device includes a timer circuit which is set at a length of time longer than a length of time required for winding one frame portion of film and is arranged to be reset every time one frame portion of film is wound up. When the roll of film is wound up to the end of the roll, the timer circuit detects the end of the film roll and permits an automatic film rewinding action to begin.

It is a second object of the invention to provide an automatic film rewinding device for an apparatus arranged to electrically control a film rewinding action, wherein the device includes mechanical switch means which automatically memorizes the condition of a rewinding action and permits resumption of the rewinding action even when the battery of the apparatus is replaced during the rewinding action.

It is a third object of the invention to provide an automatic film rewinding device for an apparatus arranged to electrically control a film rewinding action, wherein the device includes forced rewinding means which permits the operator to set a film rewinding condition as desired, so that a film rewinding operation can be resumed by the operator even when the battery of the apparatus is replaced during the film rewinding operation.

It is a fourth object of the invention to provide a film rewinding device for the above-stated apparatus, wherein the device includes display means which is arranged to inform the operator that the roll of film has not been completely rewound by indicating that the film is still under a rewinding process even when a film rewinding action comes to a stop halfway in the rewinding process, so that an accident such as premature opening of the lid of the apparatus can be prevented.

It is a fifth object of the invention to provide an automatic film rewinding device including inhibiting means which inhibits a lid opening operation before completion of a film rewinding action, so that any inadvertent lid opening operation can be prevented even when a film rewinding action is interrupted halfway in process due to consumption of the battery of the apparatus, etc.

These and further objects and features of the invention will become apparent from the following detailed description of a preferred embodiment thereof taken in connection with the accompanying drawings.

DETAILED DESCRIPTION OF THE PREFERRED EMBODIMENT

Figure 1:
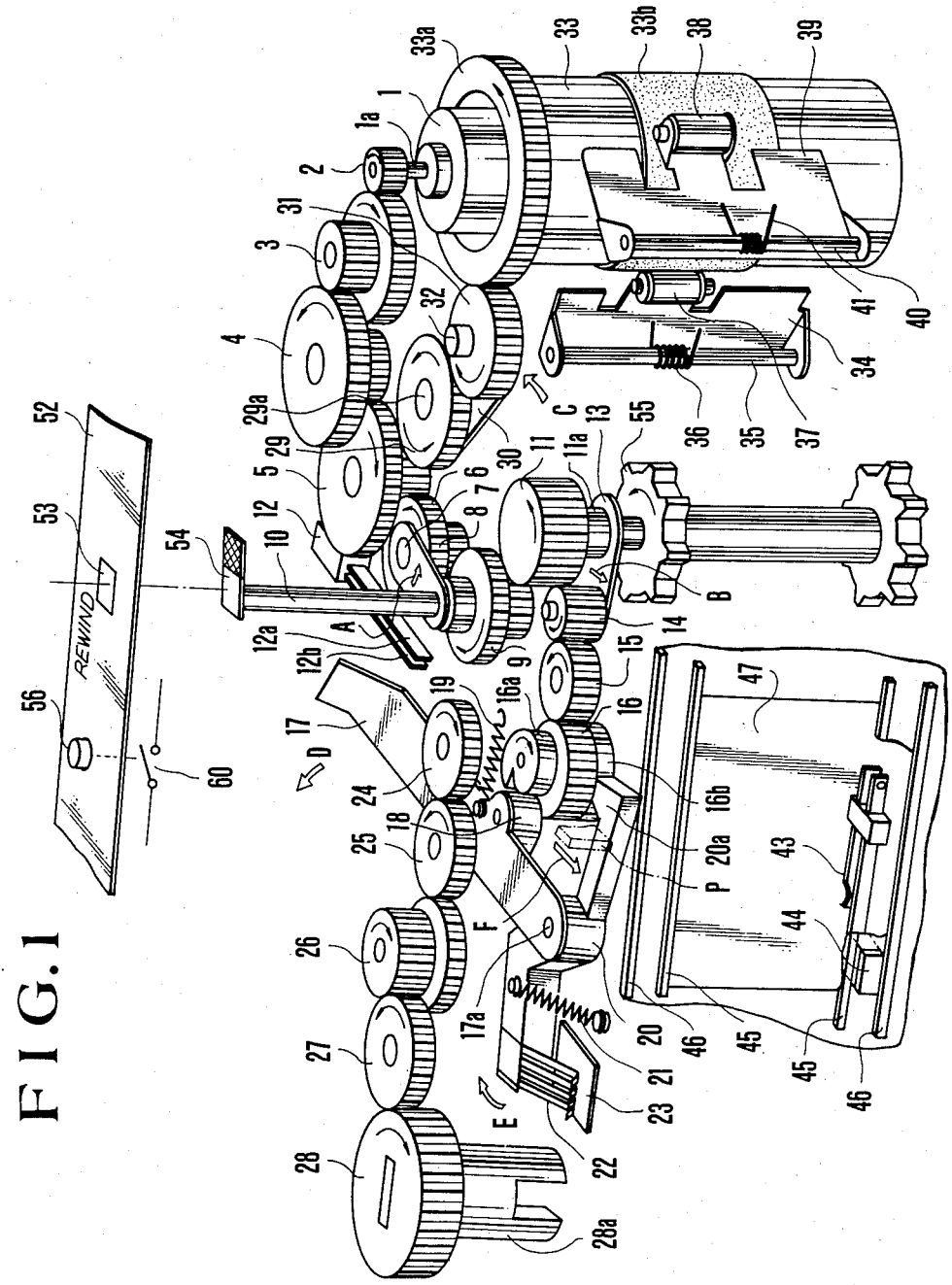
FIG. 1 is an oblique view showing almost the whole mechanism of an automatic film rewinding device embodying the present invention as applied to a camera.

An embodiment of the present invention is arranged as shown in the accompanying drawings. Referring to FIG. 1 which shows almost the whole mechanism of the invented automatic film rewinding device as applied to a camera, the embodiment includes a motor 1 which is capable of rotating in normal and reverse directions for driving film winding and rewinding mechanisms. A first stage gear 2 is arranged to rotate together with the shaft 1a of the motor 1. A gear 3 engages with the gear 2. Gears 4 and 5 follow the gear 3 to form a reduction gear train (3,4 and 5). A clutch gear 6 engages with the gear 5 to receive the rotating force of the motor 1 via the gears 2-5. A planet gear 9 engages with the clutch gear 6 and is rotatably carried by a clutch lever 8 which is arranged to turn on the shaft 7 of the clutch gear 6. An actuator 10 is secured to one side of the clutch lever 8 opposite to the planet gear 9. When the clutch lever 8 turns on the shaft 7 in a direction reverse to the direction of arrow A, the actuator comes to operate a rewinding state memory switch 12. When the clutch lever 8 turns on the shaft 7 in the direction of arrow A, a sprocket gear 11 comes to engage with the planet gear 9. The sprocket gear 11 is arranged to turn a sprocket 55 via shaft 11a in the direction of film winding. Another planet gear 14 is rotatably carried by a lever 13 which is arranged to turn on the shaft 11a of the sprocket gear 11. The planet gear 14 thus engages with the sprocket gear 11. An idle gear 15 is arranged to engage with the planet gear 14 when the lever 13 turns on the shaft 11a in the direction of arrow B. A charge gear 16 engages with the idle gear 15. The charge gear 16 is provided with an eccentric charge cam 16a which is disposed on top of the gear 16 and also with an indexing cam 16b which has a recess formed therein and is disposed in the lower part of the gear 16. The charge gear 16 is thus arranged to turn together with these cams 16a and 16b. A charge lever 17 is arranged to turn on a shaft 17a and has a follower roller 18 rotatably carried at an intermediate part thereof. The follower roller 18 is constantly caused by a tension spring 19 to strongly abut on the charge cam 16a. When the charge gear 16 turns, the follower roller 18 causes the charge lever 17 via the charge cam 16a to turn on the shaft 17a in the direction of arrow D. This movement of the charge lever 17 in the direction of arrow D charges and sets a lens and a shutter of the camera (not shown) in their initial positions for photo-taking. A follower lever 20 is arranged to be turnable on the shaft 17a independently of the charge lever 17 and is urged by a spring 21 to turn counterclockwise. A winding stopping part 20a is provided at one end of the follower lever 20. With the follower lever 20 thus being urged in the counterclockwise direction by the spring 21, the winding stopping part 20a is constantly and strongly abutting on the indexing cam 16b. Every time the indexing cam 16b makes one turn with one frame portion of the film wound up, the winding stopping part 20a enters into a recess provided in the cam 16b to terminate each one-frame winding action on the film. Further, a lever P moves in the direction of arrow F in response to a closing action of the shutter. In that instance, the lever P pushes the follower lever 20 clockwise to disengage the winding stopping part 20a from the recess of the cam 16b. The follower lever 20 is provided with a conductive contact piece 22 which is disposed at one end of the lever 20. The contact piece 22 is arranged to control film winding and rewinding actions by effecting switch-over among switches 23a, 23b and 23c (FIGS. 4 and 5) according to its contact position with a printed circuit board 23 as will be described later herein. When the lever P causes the follower lever 20 to turn clockwise in response to the shutter closing action in the last stage of a photo-taking operation, the winding stopping part 20a disengages the indexing cam 16b. Then, the contact piece 22 slides over the printed circuit board 23 in the direction of arrow E to effect thereby the switch-over among the switches 23a, 23b and 23c as will later be described. As a result of that, power supply is effected to the motor 1 and a film winding action begins. The charge gear 16 makes one turn in the direction of the arrow with one frame portion of film wound up. The winding stopping part 20a is then again caused by the urging force of the spring 21 to enter into the recess of the cam 16a. With the part 20a engaged into the recess, the contact piece 22 slides over the printed circuit board 23 in the direction reverse to the direction of arrow E to effect switch-over among the switches 23a, 23b and 23c. The power supply to the motor 1 is then cut off to bring the film winding action to a stop. A gear 24 is provided for film rewinding and is arranged to engage with the planet gear 9 when the clutch lever 8 turns on the shaft 7 in the direction reverse to the direction of arrow A. A gear 25 engages with the gear 24. Following the gear 25, gears 26 and 27 are engaged with one after another to form a film rewinding gear train (24, 25, 26 and 27). A rewinding gear 28 engages with the gear 27 and is arranged to receive the film rewinding rotating force of the motor 1 via the rewinding gear train (24, 25, 26 and 27). The rewinding gear 28 is provided with a slotted rewinding fork part 28a, which engages with a cartridge containing the film therein (not shown). A sun gear 29 is rotatable on a shaft 29a and receives a rotating force by engaging with the gear 5. The sun gear 29 also engages with a planet gear 31 which is carried by a shaft 32 of a lever 30. The lever 30 is turnable on the shaft 29a. When the lever 30 turns on the shaft 29a in the direction of arrow C, the planet gear 31 engages with a spool gear 33a which is provided on one end of a spool 33. The winding rotation force of the motor 1 is thus transmitted to the spool 33 via the gears 31 and 33a. A reference numeral 35 denotes the shaft of a film guide 34 for automatic loading. A spring 36 which is provided on the shaft 35 constantly pushes a roller part 37 against a rubber part 33b of the spool 33. A shaft 40 is provided on a back cover or lid 42 which will be described later herein. The shaft 40 carries a film guide 39 and also a spring 41 which is arranged to produce a pressing force for pushing a roller 38 provided at the fore end of the film guide 39 against the rubber part 33b of the spool 33. The camera is provided with an aperture 47. Outer and inner rails 46 and 45 are disposed at the upper and lower sides of the aperture 47. Between these rails 45 and 46 is provided a film detection button 44. When a roll of film (not shown) disappears, the contact piece of a film presence-or-absence detecting switch 43 is no longer pushed by the film detection button 44 and the switch 43 thus opens. Further, each of the gears 3, 4, 5 and 26, the clutch gear 6 and the planet gear 9 is a double gear consisting of a large diameter part and a small diameter part as shown in the drawing. The embodiment further includes a rewinding state memory switch 12. When the film is in a state of being rewound, the lever 8 turns on the shaft 7 in the direction reverse to the direction of arrow A. The actuator 10 also moves in the same direction. Then, the contact piece 12a of the switch 12 is pushed into contact with another contact piece 12b to close the switch 12. A two-colored mode indication plate 54 is disposed at the upper end of the actuator 10. One of the two color indications of the plate 54 is visible through a transparent window 53 which is provided in a cover 52 forming a part of the camera. Out of the cover 52 of the camera there protrudes a forced rewinding button 56. When this button 56 is pushed, a forced rewinding switch 60 is closed to permit the film to be freely rewound even when the film has not been completely wound up.

Figure 2:
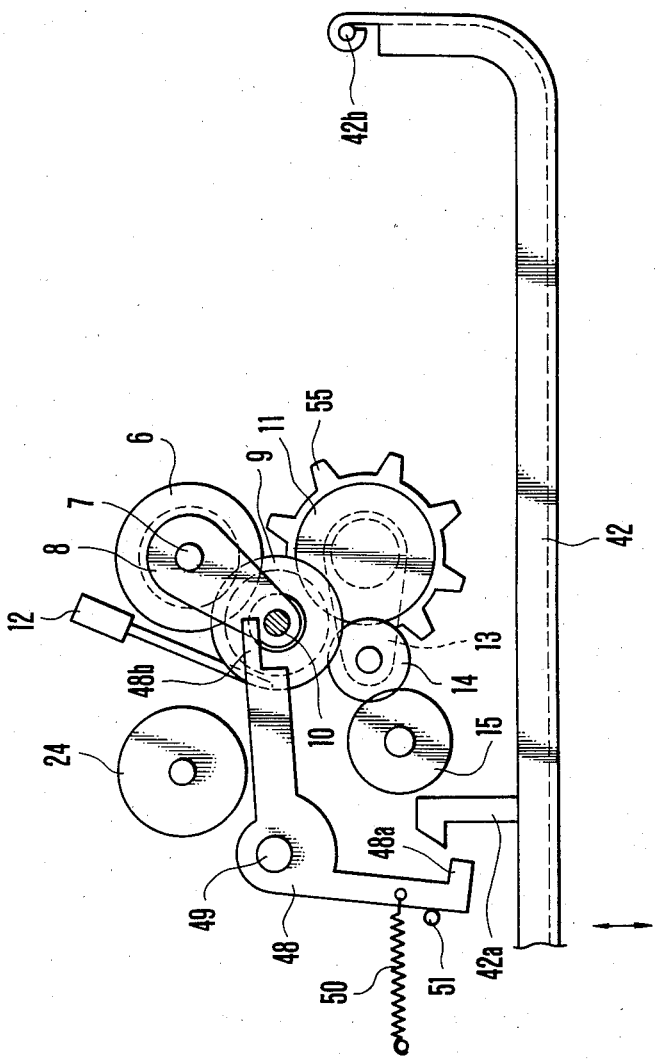
FIG. 2 is a plan view showing a part of the automatic film rewinding device according to the invention as in a state during winding up of a roll of film.
Figure 3:
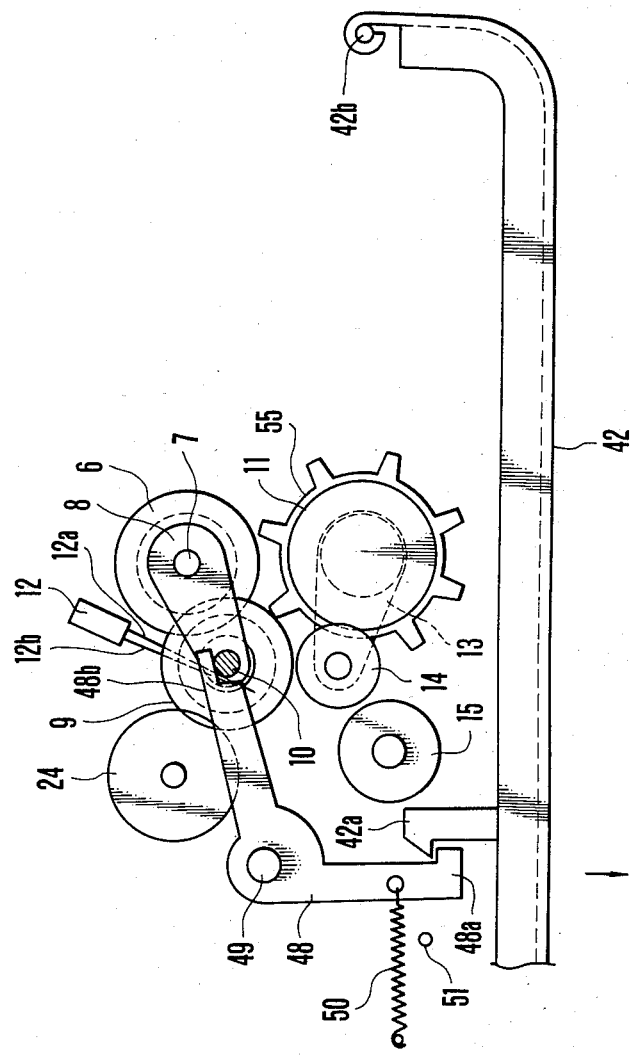
FIG. 3 is a plan view showing the same device during rewinding of the film.

FIG. 2 is a plan view showing a film winding condition of the automatic film rewinding device according to the invention. FIG. 3 is another plan view showing a film rewinding condition of the device. Referring to FIGS. 2 and 3, the illustrations of these drawings include a clutch gear 6; a shaft 7; a clutch lever 8; a planet gear 9; an actuator 10; a sprocket gear 11; a rewinding state memory switch 12; a lever 13; a planet gear 14; an idle gear 15; a rewinding gear 24; and a sprocket 55. These parts are arranged in exactly the same way as shown in FIG. 1.

A reference numeral 48 denotes an approximately L-shaped lever, which is pivotally carried by a shaft 49 and is thus arranged to be turnable on the shaft 49. A spring 50 constantly exerts a force on the lever 48 to urge it to turn clockwise. This normally keeps the lever 48 in its stop position defined by a stop member 51 unless some counteracting external force is applied to the lever 48. One end part 48b is arranged to engage with the actuator 10 and the lever 48 is arranged to be operated when the actuator 10 engages with this end part. In other words, when the clutch lever 8 turns on the shaft 7 to cause the actuator 10 to turn clockwise together with the lever 8, the actuator 10 comes to engage with the end part 48b of the lever 48 to cause the lever 48 to turn counterclockwise on the shaft 49 against the force of the spring 50. A claw 48a is formed at the other end of the lever 48. A reference numeral 42 denotes the back lid of the camera. The lid 42 is turnable on a shaft 42b in the directions of arrows as shown and is provided with an engaging claw 42a which is disposed on the inside of the lid 42. During film rewinding, the claw 48a turns on the shaft 49 in the counterclockwise direction together with the lever 48. The claw 48a then comes to engage with the engaging claw 42a of the lid 42 as shown in FIG. 3. The lid 42 is thus locked and stays closed against any force exerted thereon in the direction of the arrow.

Figure 4:
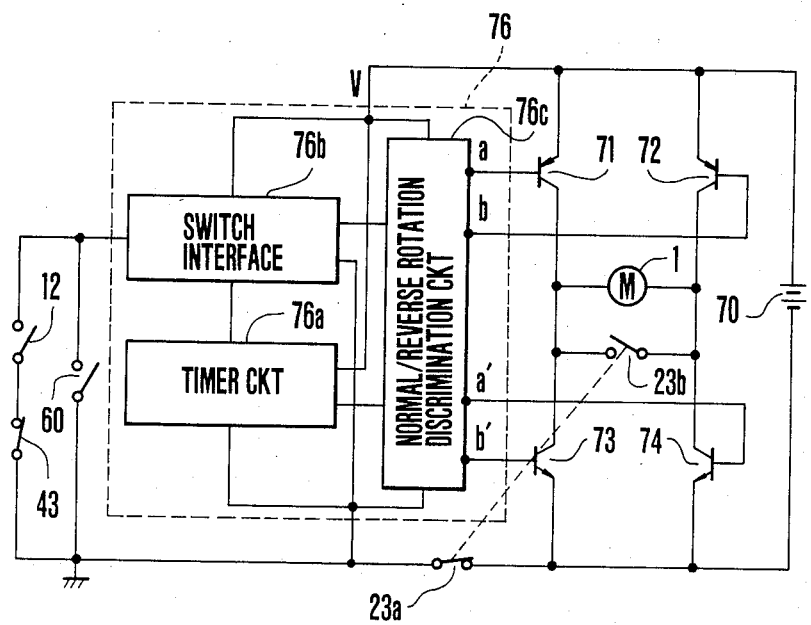
FIG. 4 is a circuit diagram showing a circuit arrangement for driving the mechanism of the automatic film rewinding device according to the invention.
Figure 5:
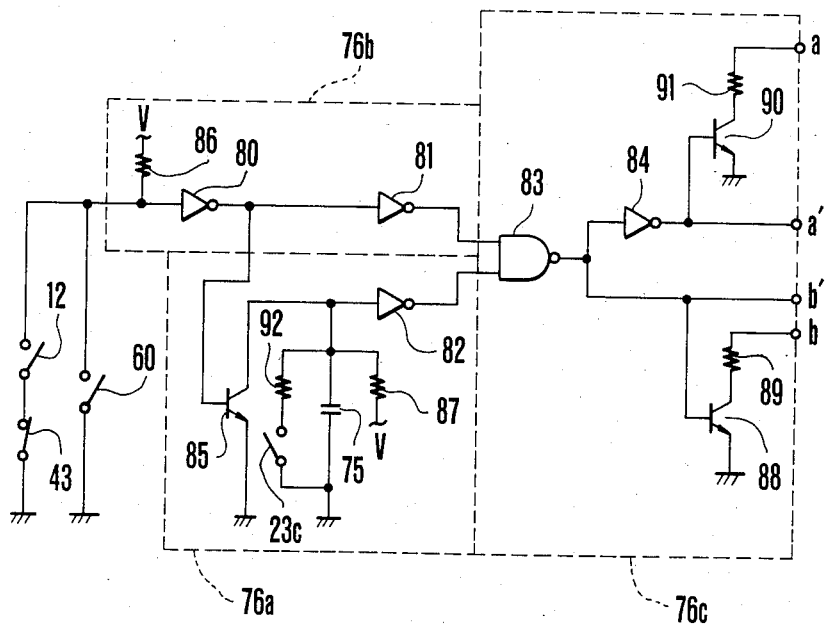
FIG. 5 is a circuit diagram showing by way of example further details of a part of the circuit arrangement shown in FIG. 4.

FIG. 4 is a circuit diagram showing a circuit arrangement for driving the mechanism of the automatic film rewinding device according to the invention. FIG. 5 is a circuit diagram showing by way of example the details of a part of the circuit arrangement shown in FIG. 4. The example of circuit arrangement shown in FIGS. 4 and 5 includes a power source battery 70; transistors 71, 72, 73 and 74 which are arranged to form a bridge; and a motor 1 which is to be used for film winding and rewinding as mentioned in the foregoing. The motor 1 is connected to intermediate points of the bridge formed by these transistors. At the time of film winding, a current is supplied in the order of the transistor 71—the motor 1—the transistor 74 to cause the motor to rotate in the normal direction. In the case of film rewinding, a current is supplied in the order of the transistors 72—the motor 1—the transistor 73 to cause the motor 1 to rotate in the reverse direction. The switch 23a is arranged to close upon completion of shutter control and thus to turn on power supply to a motor drive control circuit 76. The switch 23a opens upon completion of winding one frame portion of film. The switch 23b which is connected to the input and output terminals of the motor 1 opens upon completion of shutter control to permit power supply to the motor 1. The switch 23b closes upon completion of winding one frame portion of film to apply a braking action to the film winding action by short-circuiting the input and output terminals of the motor 1. A numeral 76a denotes a timer circuit which will be described later herein. Another numeral 76b denotes a switch interface which discriminates the states of the above-stated rewinding state memory switch 12 and the presence-or-absence detecting switch 43 or a forced rewinding switch 60 as will be further described later herein. A normal-or-reverse rotation discrimination circuit 76c is arranged to judge the states of the timer circuit 76a and the switch interface 76b and to determine whether power supply to the motor 1 is to be effected for normal rotation or reverse rotation thereof as will be further described later herein. The output of the normal-or-reverse rotation discrimination circuit 76c is arranged to be supplied to the base side of each of the transistors 71, 72, 73 and 74. The timer circuit 76a, the switch interface 76b and the normal-or-reverse rotation discrimination circuit 76c jointly form the motor drive control circuit 76. The above-stated rewinding state memory switch 12 is arranged to close when film rewinding begins and to open when a next film winding action begins. The above-stated film presence-or-absence detecting switch 43 is arranged to close while the film is on the surfaces of the rails 45 and 46 disposed above and below the aperture 47 shown in FIG. 1 and to open when the film disappears from the surfaces of the rails 45 and 46. The forced rewinding switch 60 is arranged to permit the camera operator to manually close it to forcedly drive the motor to perform film rewinding when the operator desires film rewinding before all the prescribed number of frame portions of film have been wound up. The rewinding state memory switch 12 and the film presence-or-absence detecting switch 43 are series connected to each other and are parallel connected to the manual rewinding switch 60. The details of the motor drive control circuit shown in FIG. 4 are arranged as shown in FIG. 5. In FIG. 5, the timer circuit 76a, the switch interface 76b and the normal-or-reverse rotation discrimination circuit 76c are encompassed respectively with broken lines and are indicated by the same reference numerals.

Referring to FIG. 5, the circuit arrangement includes a pull-up resistor 86 which is arranged to give a high level signal to an inverter 80 when the above-stated switches 12, 43 and 60 are open. A transistor 85 is emitter grounded. The signal produced from the inverter 80 is supplied to the base of the transistor 85. The collector of the transistor 85 is connected to the input terminals of a capacitor 75 which has one terminal thereof grounded, a pull-up resistor 87 and an inverter 82. Further, a series circuit consisting of a resistor 92 and a switch 23c is parallel connected to the capacitor 75. The switch 23c is arranged to operate in the same manner as the switch 23b in response to the latter. A NAND gate 83 is arranged to have the signals produced from the inverters 81 and 82 supplied thereto. A signal produced from the NAND gate 83 is supplied to a terminal "a'" of the normal-or-reverse rotation discrimination circuit 76c via an inverter 84. The signal from the NAND gate 83 is also supplied to another terminal "a" of the normal-or-reverse rotation discrimination circuit 76c via this inverter 84, a transistor 90 which is emitter grounded and a current controlling resistor 91 which is connected to the collector of the transistor 90. Further, a terminal "b'" of the normal-or-reverse rotation discrimination circuit 76c is arranged to receive the signal produced from the NAND gate 83 as it is. Meanwhile, another terminal "b" of the normal-or-reverse rotation discrimination circuit 76c on the other hand is arranged to receive the signal from the NAND gate 83 via an emitter grounded transistor 88 and a current limiting resistor 89 which is connected to the collector of the transistor 88. These terminals "a","a'", "b" and "b'" of the normal-or-reverse rotation discrimination circuit 76c are respectively connected to the bases of the transistors 71, 74, 72 and 73.

The embodiment which is arranged as described above operates such that when a shutter (not shown) is released, the lever P causes the follower lever 20 to turn clockwise in response to a shutter closing action. The winding stopping part 20a of the follower lever 20 then disengages the recess of the cam 16b. At the same time, the contact piece 22 moves to shift the switches 23a, 23b and 23c. Then, a circuit operation which will be described later herein causes the motor 1 to rotate in the direction of arrow, i.e. in the normal rotating direction. The normal rotation of the motor 1 in turn causes the gear 2 to turn via the shaft 1a to initiate a film winding action. With the gear 2 rotated, the rotating force of the motor 1 is transmitted to clutch gear 6 via the reduction gear train (3, 4 and 5) which rotates in the direction of the arrow as shown. The clutch gear 6 rotates in the direction of the arrow. This causes the clutch lever to turn on the shaft 7 in the direction of arrow A. The planet gear 9 then comes to engage with the sprocket gear 11. The planet gear 9 and the sprocket gear 11 rotate respectively in the directions of the arrows as shown. The rotation of the sprocket gear 11 causes the sprocket 55 to turn in the same direction via the shaft 11a. As a result of that, the film is fed from left to right toward the spool 33. Meanwhile, the sun gear 29 which engages with the gear 5 turns in the direction of arrow as shown. This causes the lever 30 to turn on the shaft 29a in the direction of arrow C to have the planet gear 31 engage with the spool gear 33a. The planet gear 31 which is caused to turn in the direction of the arrow as shown by the sun gear 29, then causes the spool gear 33a to turn in the direction of the arrow as shown. The spool 33 turns in the same direction as the spool gear 33a. Then, by virtue of the actions of the rubber part 33b of the spool 33 and the rollers 38 and 37, the film (not shown) is forwarded via the sprocket 55 and is firmly and automatically taken up on the spool 33. The arrangement and operation of this film winding part has been disclosed in detail in Japanese Laid-Open Patent Application No. SHO 57-172322 and therefore further description will be omitted herein. The rotating force transmitted to the sprocket gear 11 moves the film forward and, at the same time, causes the lever 13 to turn on the shaft 11a in the direction of the arrow B. This in turn causes the planet gear 14 to engage with the idle gear 15. Accordingly, the rotating force of the sprocket gear 11 is transmitted to the charge gear 16 via the planet gear 14 and the idle gear 15 which are rotating in the directions of the arrows as shown. The charge gear 16 then rotates together with the charge cam 16a and the indexing cam 16b in the direction of the arrow as shown. One turn of charge cam 16a causes the follower roller 18 to turn on the shaft 17a in the direction of the arrow D together with the charge lever 17 against the force of the spring 19. After that, the follower roller 18 moves in the direction reverse to the arrow D and comes back to its original position. Meanwhile, the lens of an automatic focusing device and the shutter (not shown) engaging with the charge lever 17 are charged and brought back to their initial photographing positions by the movement of the charge lever 17 in the direction of the arrow D. When the lever P comes back to its initial position in response to the above-stated shutter charging action, the winding stopping part 20a which has been disengaged from the recess of the indexing cam 16b is urged to turn counterclockwise by the force of the spring 21. However, this is prevented by the indexing cam 16b on which it comes to abut. As a result of that, the winding action is allowed to continue. After that, when the indexing cam 16b completes one turn in response to winding of one frame portion of the film, the winding stopping part 20a again enters into the recess of the indexing cam 16b to stop the charge gear 16. Then, concurrently with this, the contact piece 22 moves over the printed circuit board 23 in the direction reverse to the arrow E to shift thereby the switches 23a, 23b and 23c. The input terminal of the motor 1 is short-circuited to stop the motor 1 from rotating by thus applying the brake thereto. The action of winding one frame portion of the film thus comes to an end. After that, when the shutter is again released, a shutter closing action again causes the follower lever 20 to temporarily turn on the shaft 17a in the direction of the arrow E. The contact piece 22 then moves to open the switch 23b which is formed by the contact piece 22 and the printed circuit board 23. This releases the input terminal of the motor 1 from the state of being short-circuited. The switch 23a is closed to switch on the power source and a next film winding action begins.

Further, in the operation described, after the film (not shown) is firmly wound around the spool 33, the film is no longer taken up by the sprocket 55 but is taken up by the spool 33. In other words, the motor 1 is caused to rotate together with the gear 2 via the shaft 1a in the direction of the arrow as shown in the same manner as mentioned above in response to a shutter closing action. The rotating force of the motor 1 is transmitted to the spool gear 33a via the gears 3, 4 and 5, the sun gear 29 and the planet gear 31. The spool 33 then turns in the direction of film winding, i.e. in the direction of the arrow as shown. The film is thus taken up by the spool 33. The travel of the film then causes the sprocket 55 to turn in the direction of the arrow as shown. The rotating force of the sprocket 55 is transmitted to the sprocket gear 11 via the shaft 11a. The sprocket gear 11 turns in the direction of the arrow as shown. The turning speed of the sprocket gear 11 is arranged to be higher than that of the planet gear 9 which is turned in the direction of the arrow as shown by the motor 1 via the gear 2, the reduction gear train (3, 4 and 5) and the clutch gear 6 with the gear ratios of these gears being arranged to ensure that. Therefore, the clutch gear 9 comes to be turned solely by the force of the sprocket gear 11. Meanwhile, the turning force of the sprocket gear 11 is transmitted to the charge gear 16 via the planet gear 14 and the idle gear 15 as mentioned in the foregoing. The charge cam 16a which turns together with the charge gear 16 causes the charge lever 17 to move in the direction of the arrow D via the follower roller 18. As a result, the aforementioned lens and the shutter are set into their initial states as mentioned in the foregoing. Further, when the indexing cam 16b makes one turn, the follower lever 20 causes the contact piece 22 to move over the printed circuit board 23. After that, the contact piece comes back to its position in which it stays before film winding. The switch 23a which is formed by the relation between the contact piece 22 and the printed circuit board 23 for power supply opens and the switch 23b closes. The input and output terminals of the motor 1 are short-circuited to bring the rotation of the motor 1 to a stop. The film winding operation then remains at rest until completion of a next shutter operation. Further, during the film winding operation, a force is applied to the actuator 10 to turn it counterclockwise on the shaft 7 together with the clutch lever 8. This prevents the actuator 10 from engaging with the end 48b of the lever 48 as shown in FIG. 2. Accordingly, the lever 48 is solely under the restoring force of the spring 50 and is in the stop position defined by the stop member 51 with the spring 50 urging it to turn clockwise on the shaft 49. Under this condition, therefore, the claw 48a of the lever 48 and the engaging claw 42a of the back lid 42 never engage with each other. Since the contact piece of the rewinding state memory switch 12 is not pushed by the actuator 10, the switch 12 is open. The mode indicating plate 54 shows one of the two colors located on the left hand side through the transparent window 53, as shown by a one-dot-chain line in FIG. 1, to indicate that the camera is in a state of winding up the film.

When the film becomes tightly stretched after completion of film winding, the rotating force of the motor 1 becomes unable to overcome this stretching force and the spool 33 and the sprocket 55 come to a stop. The charge cam 16a and the indexing cam 16b also come to a stop and the contact piece 22 no longer moves. Then, since film winding is no longer accomplished even after the lapse of a pedetermined time, the motor 1 is caused to reverse its direction of rotation by the control circuit 76 shown in FIG. 4. The film is thus automatically rewound on the cartridge (not shown). More specifically, the gear 2 turns in the direction reverse to the direction of the arrow when the motor reversely rotates. The components of the reduction gear train (3, 4 and 5) which is interlocked with the gear 2, the clutch gear 6 and the sun gear 29 also turn in directions reverse to the directions indicated by the arrows shown in the drawing. The turning force of the sun gear 29 causes the lever 30 to turn on the shaft 29a in the direction reverse to the arrow C. The planet gear 31 then moves together with the lever 30 and thus disengages from the spool gear 33a. As a result, the spool gear 33a and the spool 33 which is attached to the spool gear 33a become free to rotate. The turn of the clutch gear 6 in the direction reverse to the direction of the arrow causes the clutch lever 8 to turn on the shaft 7 in the direction reverse to the arrow A together with the planet gear 9 and the actuator 10. The planet gear 9 disengages from sprocket gear 11 and comes to engage with the gear 24. At this time, the actuator 10 pushes the contact piece 12a of the rewinding state memory switch 12 toward the other contact piece 12b to bring them into contact with each other as shown in FIG. 3. The rewinding state memory switch 12 is thus closed. Further, the actuator 10 engages with the end part 48b of the lever 48 to cause the lever 48 to turn on the shaft 49 counterclockwise against the force of the spring 50. The claw 48a of the lever 48 is thus caused to engage with the engaging claw 42a of the back lid 42 of the camera body. During the film rewinding mode, therefore, the lid 42 is locked by the engagement between the claws 48a and 42a and cannot be opened by an attempt to turn it on the shaft 42b. Referring further to FIG. 1, this movement of the actuator 10 shifts the two-color mode indicating plate 54. The plate 54 then comes to show through the transparent window one of the two colors other than the color indicated by the one-dot-chain line in FIG. 1. This enables the operator of the camera to know that the camera is in the film rewinding mode. Meanwhile, since the planet gear 9 which is engaging with the clutch gear 6 turns in the direction reverse to the direction of the arrow, the film rewinding gear train (24, 25, 26 and 27) which is receiving the turning force of the planet gear 9 comes to turn in the direction of the arrows as shown. The rewinding gear 28 which engages with the gear 27 also turns in the direction of the arrow as shown. This causes the rewinding forked part 28a to turn in the same direction. As a result, the cartridge (not shown) engaged with the rewinding forked part 28a rewinds the film from the spool 33 via the sprocket 55. At the beginning of this film rewinding operation, the turning force of the sprocket 55 which begins to turn in the direction reverse to the direction of the arrow is transmitted to the shaft 11a and thus causes the lever 13 to turn on the shaft 11a in the direction reverse to the arrow B. The reverse turn of the lever 13 disengages the planet gear 14 from the idle gear 15 to make the sprocket 55 free to turn. Therefore, no unnecessary load is imposed on the rewinding operation.

In the event that the power source battery which is arranged to drive the motor 1 is consumed to such an extent as to disable the motor from continuing the film rewinding work halfway in the process of the work, the film rewinding state mentioned in the foregoing is retained. In other words, the actuator 10 does not move. Therefore, the two-color mode indicating plate continues to indicate via the transparent window that the camera is still in the film rewinding mode. Meanwhile, the rewinding state memory switch 12 remains closed. The back lid 42 is kept in the locked state with the engaging claw 42a thereof kept engaged with the claw 48a of the lever 48. In this instance, therefore, the operator is enabled by the mode indicating color through the transparent window to confirm that the camera is still in the rewinding mode even when the operation of the rewinding mechanism is interrupted and is thus informed of the necessity for replacing the consumed power source battery with a new one. Further, since the rewinding state memory switch 12 remains closed, the film rewinding operation can be resumed starting from the interrupted state after replacement of the power source battery.

When the whole roll of film has been thus rewound, the disappearance of film stops the film detecting button 44 which is disposed within the aperture 47 between the inner and outer rails 45 and 46 from pushing the contact piece of the film presence-or-absence detecting switch 43. This opens the switch 43. With the film presence-or-absence detecting switch 43 thus opened, the motor drive control circuit 76 shown in FIG. 4 shifts the film rewinding state to the film winding state in a manner as will be described later herein. This causes the motor 1 to rotate in the normal direction and the gear 2 to be turned via the shaft 1a in the direction of the arrow. All the clutch levers 8, 30, 13, etc. then turn in the film winding directions to bring the camera into the film winding state. After that, the film winding mechanism turns in the film winding direction in the same manner as has been described in the foregoing to an extent corresponding to a film winding unfinished portion of the indexing cam 16b. The motor 1 is stopped from rotating upon completion of indexing by the cam 16b. As a result of that, the camera comes back to the condition as shown in FIGS. 1 and 2. Then, the two-color mode indicating plate 54 comes to indicate the film winding mode and the back lid 42 may be opened. Further, in case where it is desired to rewind the film before completion of film winding, the camera operator pushes with a finger the forced rewinding button 56. This causes the forced rewinding switch 60 to close and, at the same time, causes a mechanism (not shown) to turn the lever 20 in the direction of the arrow E. The contact piece 22 is shifted accordingly. In this instance, the turn of the lever 20 in the direction of the arrow E may be arranged to be effected in response to a shutter release operation.

Referring to FIGS. 4 and 5, the circuit arrangement for driving the automatic film rewinding device of FIGS. 1, 2 and 3 according to the invention operates as follows: At the beginning of film winding with the camera having been loaded with a roll of film, the rewinding state memory switch 12 is opened as mentioned in the foregoing. The film presence-or-absence detecting switch 43 is closed as the film detecting button 44 is pushed by the film which has been loaded. Then, under normal conditions, the forced rewinding switch 60 is left open. When the switch 23a is closed by shutter release, the power supply of the power source battery 70 is effected to the motor drive control circuit 76. Then, since the input of the inverter 80 has been pulled up to a high level by the pull-up resistor 86, the level of the output signal of the inverter 80 becomes low. This signal is supplied to the transistor 85 of the timer circuit 76a via the switch interface 76b. The signal renders the transistor 85 non-conductive. Since the switch 23c is then opened in synchronism with the switch 23a, the capacitor 75 begins to be charged via the resistor 87. As a result, the timer circuit 76a begins to operate. Since the signal from the inverter 80 is the input signal of the inverter 81, the inverter 81 which has received the low level signal from the inverter 80 produces a high level signal therefrom. Accordingly, the high level signal is supplied from the switch interface 76b to the normal-or-reverse rotation discrimination circuit 76c. Meanwhile, the input signal of the inverter 82 is the charge voltage of the capacitor 75 and the charge voltage of the capacitor 75 does not exceed the threshold voltage value of the inverter 82 for a predetermined period of time after the power supply is turned on. Therefore, the level of the signal produced from the inverter 82 becomes high. Therefore, this high level output signal is supplied from the timer circuit 76a to the normal-or-reverse rotation discrimination circuit 76c. The NAND gate 83 is arranged to receive the signal from the inverter 81 and also the signal from the inverter 82. Therefore, with the high level signals supplied from the inverters 81 and 82, the NAND gate 83 produces a low level signal. The low level signal is supplied to the terminal "b'" and the base of the transistor 88. This renders the transistor 88 non-conductive. Further, the low level signal is supplied also to another inverter 84. The inverter 84, therefore, produces a high level signal. The high level signal from the inverter 84 is supplied to the terminal "a'" and the base of the transistor 90. The transistor 90 becomes conductive. This in turn renders the transistor 71 conductive via the resistor 91. The transistor 74 is also rendered conductive via the terminal "a'". The terminal "b'" on the other hand is at a low level and, since the terminal "b'" is in a non-conductive state, transistors 72 and 73 are in a non-conductive state. The switch 23b is in an open state when shutter control is completed as mentioned in the foregoing. Therefore, power supply is effected to the closed circuit of the power source battery 70—the transistor 71—the motor 1—the transistor 74. The motor 1 rotates in the normal direction to wind up the film in the manner as has been described in the foregoing. When one frame portion of the film has been wound up, the switch 23b is closed to short-circuit the input and output terminals of the motor 1 and the switch 23a is opened. The motor 1 is stopped from rotating and the film winding action comes to a stop. Then, in synchronism with that, the switch 23c is closed to discharge the electric charge of the capacitor 75. The switch 23a is thus opened and the switches 23b and 23c are closed at the point of time when one frame portion of the film is completely wound. Upon completion of a shutter operation, the switch 23a is closed and the switches 23b and 23c are opened. These switches 23a, 23b and 23c are respectively formed by the contact piece 22, the printed circuit board 23, etc. shown in FIG. 1. As has been described in the foregoing, the winding stopping part 20a which is provided at one end of the follower lever 20 evages into the recess of the indexing cam 16b upon completion of winding one frame portion of the film. The follower lever 20 then turns on the shaft 17a in the direction opposite to the arrow E. This causes the contact piece 22 to slide over the printed circuit board 23. This sliding movement of the contact piece 22 operates the switches 23a, 23b and 23c in the manner as described above. Further, upon completion of the shutter operation, the lever P causes the follower lever 20 to turn on the shaft 17a in the direction of the arrow E to operate thereby the switches 23a, 23b and 23c also in the same manner as mentioned above. After that, at the time of a next film winding action, the switches 23a and 23b are kept in the same state by the relation between the follower lever 20 and the indexing cam 16b. For simplification's sake, the details of the arrangement of these switches 23a, 23b and 23c are omitted from the drawings. The length of time required for charging the capacitor 75 up to the threshold voltage value of the inverter 82 via the resistor 87 is preset to be longer than a length of time required in winding one frame portion of the film. Therefore, at the point of time when one frame portion of film has been wound up, the switch 23a is opened. The levels of the terminals "a'" and "b'" of the normal-or-reverse rotation discrimination circuit 76c of the motor drive control circuit 76 become low. The terminals "a'" and "b'" thus become non-conductive when the transistors 88 and 90 become non-conductive. Therefore, all the transistors 71, 72, 73 and 74 become non-conductive. The input and output terminals of the motor 1 are short-circuited by the switch 23b to apply the brake to the motor 1. The motor 1 thus comes to a stop. When all frame portions of film have been wound up and the film condition to permit no further winding, the switch 23a will remain closed and the switches 23b and 23c remain opened. Therefore, the capacitor 75 continues to be charged via the resistor 87. When the charge voltage of the capacitor 75 comes to exceed the threshold voltage value of the inverter 82, the inverter 82 produces a low level signal to the NAND gate 83. Upon receipt of this signal, the NAND gate 83 produces a high level signal to the terminal "b'" of the normal-or-reverse rotation discrimination circuit 76c. The high level signal is also supped to the base of the transistor 88 to render the transistor 88 conductive. Meanwhile, the inverter 84 which receives this high level signal produces a low level signal to the terminal "a'". The low level signal is also supplied to the base of the transistor 90 to render the transistor 90 non-conductive. Accordingly, the transistor 72 is rendered conductive via the resistor 89 and the transistor 88 while the transistor 73 also becomes conductive as the high level signal is supplied to the base thereof. However, the transistor 72 is non-conductive as the terminal "a" is non-conductive. Another transistor 74 which has the low level signal supplied from the terminal "a'" to the base thereof also becomes non-conductive. Therefore, power supply is effected to the closed circuit of the power source battery 70—the transistor 72—the motor 1—the transistor 73. Here, it is important to note that, in this instance, the motor 1 rotates in the reverse direction as the current flowing to the motor 1 flows in the direction reverse to the direction in which current flows to the motor at the time of film winding. The film is rewound by the reverse rotation of the motor 1. As has been mentioned with reference to FIGS. 1, 2 and 3 in the foregoing, the rewinding state memory switch 12 is closed in the beginning of film rewinding. Since the film presence-or-absence detecting switch 43 is closed, the input terminal of the inverter 80 is grounded and the inverter 80 produces a high level signal therefrom. The high level signal is supplied to the inverter 81. The inverter 81 then produces a low level signal, which is supplied to the NAND gate 83. Meanwhile, the transistor 85 which receives the high level output signal of the inverter 80 at the base thereof becomes conductive. The charge voltage of the capacitor 75 is discharged via the transistor 85. Therefore, the charge voltage of the capacitor 75 no longer exceeds the threshold voltage value of the inverter 82. This enables the inverter 82 to produce a high level signal to the NAND gate 83. Accordingly, the NAND gate 83 thus receives the low level signal from the inverter 81 and the high level signal from the inverter 82. The NAND gate 83, therefore, produces the high level signal as it is to keep the camera in the film rewinding state.

Under this condition, even if the power source battery 70 is removed for replacement in the event that the circuit arrangement becomes inoperative due to consumption of the power of the battery, the relation between the indexing cam 16b and the follower lever 20 shown in FIG. 1 is kept in a winding unfinished state. Therefore, the switch 23a remains closed and the switches 23b and 23c remain opened. Further, since the rewinding state memory switch 12 is kept closed, the rewinding state before replacement remains unchanged when the power source battery 70 is replaced with a new battery. After replacement, therefore, the film rewinding operation is resumed and carried out in the same manner as before. Upon completion of film rewinding, the film presence-or-absence detecting switch 43 is opened. The pull-up resistor 86 supplies a high level signal to the inverter 80. Accordingly, the inverter 80 produces a low level signal and supplies it to the inverter 81 and the transistor 85. Upon receipt of this signal, the inverter 81 produces a high level signal. Meanwhile, the transistor 85 becomes non-conductive and allows the capacitor 75 to be charged via the resistor 87. Since the charge voltage of the capacitor 75 does not exceed the threshold voltage value of the inverter 82, the inverter 82 produces a high level signal. The NAND gate 83 which receives the high level signals from both the inverters 81 and 82 produces a low level signal. This low level signal is supplied to the inverter 84 and, in the same manner as described in the foregoing, is produced in the form of a high level signal from the terminal "a'" of the normal-or-reverse rotation discrimination circuit 76c. This high level signal renders the terminal "a" conductive via the resistor 91 and the transistor 90. Accordingly, the transistors 71 and 74 become conductive. As a result, a closed circuit is formed for power supply as follows: Power source battery 70—transistor 71—motor 1—transistor 74. The motor 1 rotates in the normal direction to perform a winding action on the remaining winding portion of the film. Upon completion of this winding action, the rewinding state memory switch 12 is opened. The switch 23a is also opened while the switches 23b and 23c are closed and the winding operation comes to a stop.

Further, during the film winding process, if the camera operator closes the forced rewinding switch 60, the input terminal of the inverter 80 is grounded and the film is rewound in the same manner as in the case of automatic rewinding where the switches 12 and 43 are closed.

Referring further to FIG. 4, when the switch 23b is closed, the transistors 71, 72, 73 and 74 might be damaged by a momentarily flowing current. To prevent such damage, therefore, it is preferable to have some current controlling means such as Zenor diode interposed in a suitable manner.

Further, the switch 23c and the resistor 92 which are provided for the purpose of discharging are not absolutely necessary, because the electric charge of the capacitor 75 may be discharged through some other circuit.

With the invention applied, for example, to a camera as described in the foregoing, the invention obviates the necessity for detecting the travelling condition of film during a winding operation. This feature of the invention dispenses with a detecting member such as a rotating body hitherto used for detecting the travelling condition of the film during a film winding operation and also dispenses with such additional arrangement as provision of a differentiation circuit, etc. The structural arrangement of the automatic film rewinding device according to the invention, therefore, can be simplified to a great degree. Besides, the various problems that have hitherto been encountered during a film rewinding operation can be solved in accordance with the invention.

What we claim:

1. An automatic film rewinding device for a camera, comprising:
    (a) winding means for automatically winding a film;
    (b) rewinding means for automatically rewinding the film;
    (c) an automatic reversing circuit which electrically detects the end of the film winding operation of said winding means when said film comes to the end of the roll and actuates said rewinding means; and (d) mechanical memory means for mechanically memorizing that the film is under a rewinding operation, said memory means being arranged to cause said rewinding means to perform the rewinding operation until completion thereof.

2. A device according to claim 1, further including indicating means for indicating that the film is under rewinding until completion of the rewinding operation.

3. A device according to claim 1, further including forced rewinding means for causing said rewinding means to perform rewinding irrespective of the operation of said automatic reversing circuit.

4. A device according to claim 3, wherein said mechanical memory means and said forced rewinding means are connected in parallel with each other.

5. A device according to claim 4, further including rewinding completion detecting means for detecting completion of rewinding of said film, said detecting means being connected in series with said mechanical memory means, said forced rewinding means being connected in parallel with the series connection of the rewinding completion detecting means and the mechanical memory means.

6. An automatic film rewinding device according to claim 1, wherein said automatic reversing circuit includes:
   (A) timer means for starting the operation of said rewinding means when said means has counted a predetermined length of time; and
   (B) prohibition means for prohibiting the timer means from functioning before said timer means counts said predetermined length of time, said prohibition means becoming unable to function when the winding operation of said winding means stops during the course of its operation.

7. An automatic film rewinding device according to claim 6, wherein said timer means includes resetting means for resetting said timer means in association with the operation of said rewinding means.

8. An automatic film rewinding device according to claim 6, wherein said resetting means includes switching means for resetting said timer means in association with an operation of said mechanical memory means.

9. A device according to claim 8, wherein said mechanical memory means is arranged to memorize a rewinding state in response to the start of operation of said rewinding means.

10. An automatic film rewinding device according to claim 1, further including:
    (A) a back lid which can be opened and closed; and
    (B) blocking means for blocking an opening operation of said back lid until the rewinding operation has been completed.

11. A camera which can perform automatic winding and rewinding of film, comprising:
    (A) a spool for taking up the film;
    (B) electric winding means for driving said spool to perform a winding operation;
    (C) a sprocket which is rotated by movement of the film as said film is taken up by said spool;
    (D) control means for effecting windup of one frame of film and for detecting the amount of movement of the film in response to rotation of said sprocket and for stopping said electric winding means when said control means detects that one frame of the film has been wound;
    (E) electric rewinding means for carrying out rewinding of the film;
    (F) timer means for controlling said electric rewinding means to perform the rewinding operation after elapse of a length of time commencing from the start of the one frame winding operation by the electric winding means which is longer than the period of time required by said electric winding means for windup of one film frame, said timer means operating so as to not have said electric rewinding means carry out the rewinding operation before said length of time has elapsed; and
    (G) rewinding prohibition means disabling said timer means from functioning when said control means for the winding of one frame detects the completion of said one frame windup of the film within the period of time the electric winding means requires for the completion of one frame winding.

12. A camera according to claim 11, wherein said electric winding means and said electric rewinding means have a common motor as their driving source, said motor changing its rotating direction from a winding direction over to a rewinding direction by the action of said timer means.

13. A camera according to claim 11, further including memory means for mechanically memorizing an unfinished state of rewinding as long as said rewinding by said rewinding means remains incomplete.

14. A camera according to claim 11, further including indicating means for indicating an unfinished state of rewinding as long as said rewinding by said rewinding means remains incomplete.

15. A camera according to claim 11, further including forced rewinding means for forcedly performing rewinding irrespective of said rewinding means.

* * * * *

UNITED STATES PATENT AND TRADEMARK OFFICE
CERTIFICATE OF CORRECTION

PATENT NO. : 4,542,865
DATED : September 24, 1985
INVENTOR(S) : Tateo Yamada, et al It is certified that error appears in the above-identified patent and that said Letters Patent is hereby corrected as shown below:

In the heading of the Patent, it should read:

-- [30]    Foreign Application Priority Data

Nov. 25, 1982 [JP]    Japan .......57-206301
Feb. 28, 1983 [JP]    Japan .......58-30869 --

Signed and Sealed this

Eighth Day of July 1986

[SEAL]

Attest:

DONALD J. QUIGG

Attesting Officer

Commissioner of Patents and Trademarks